United States Patent Office 3,211,340
Patented Oct. 12, 1965

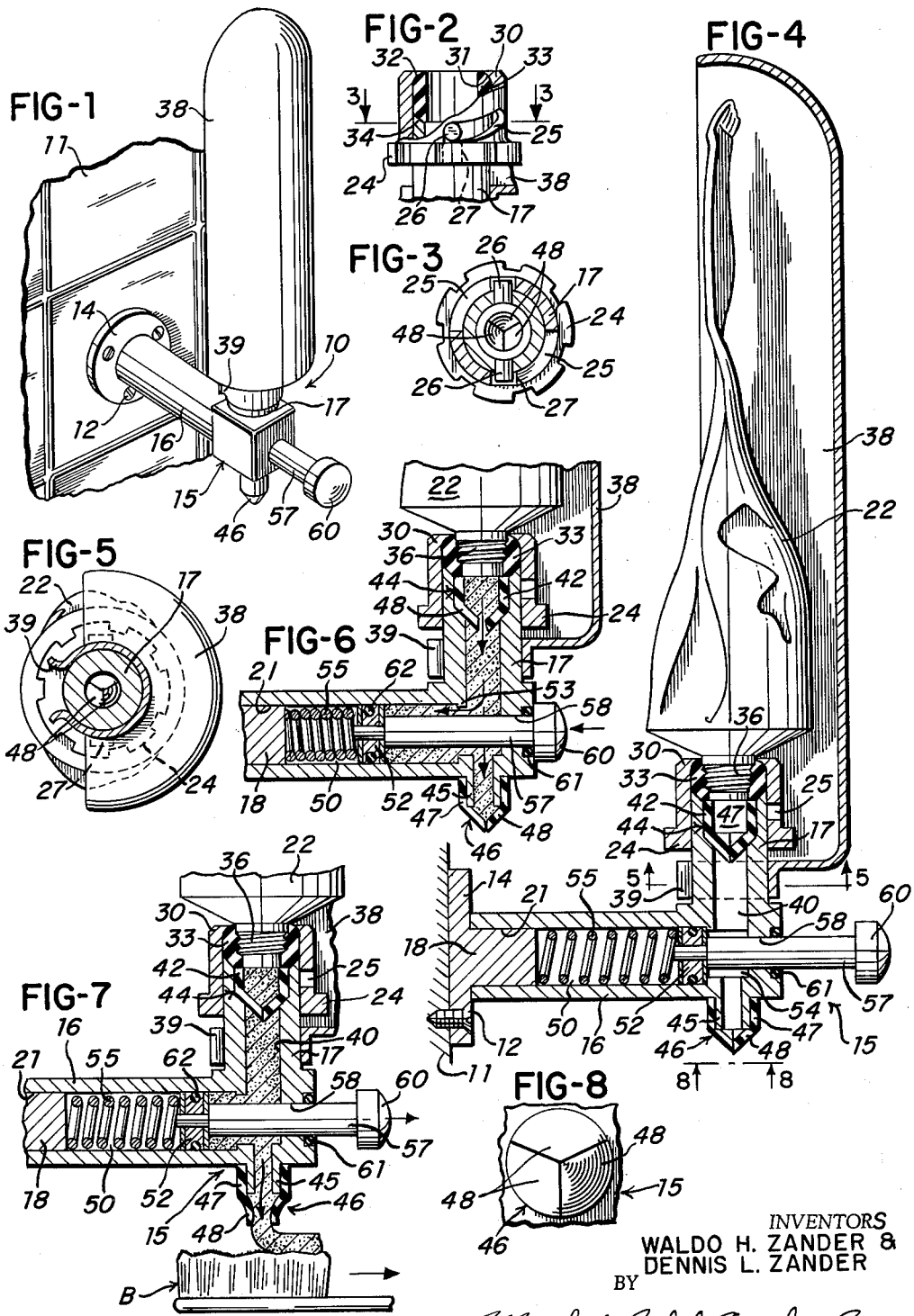

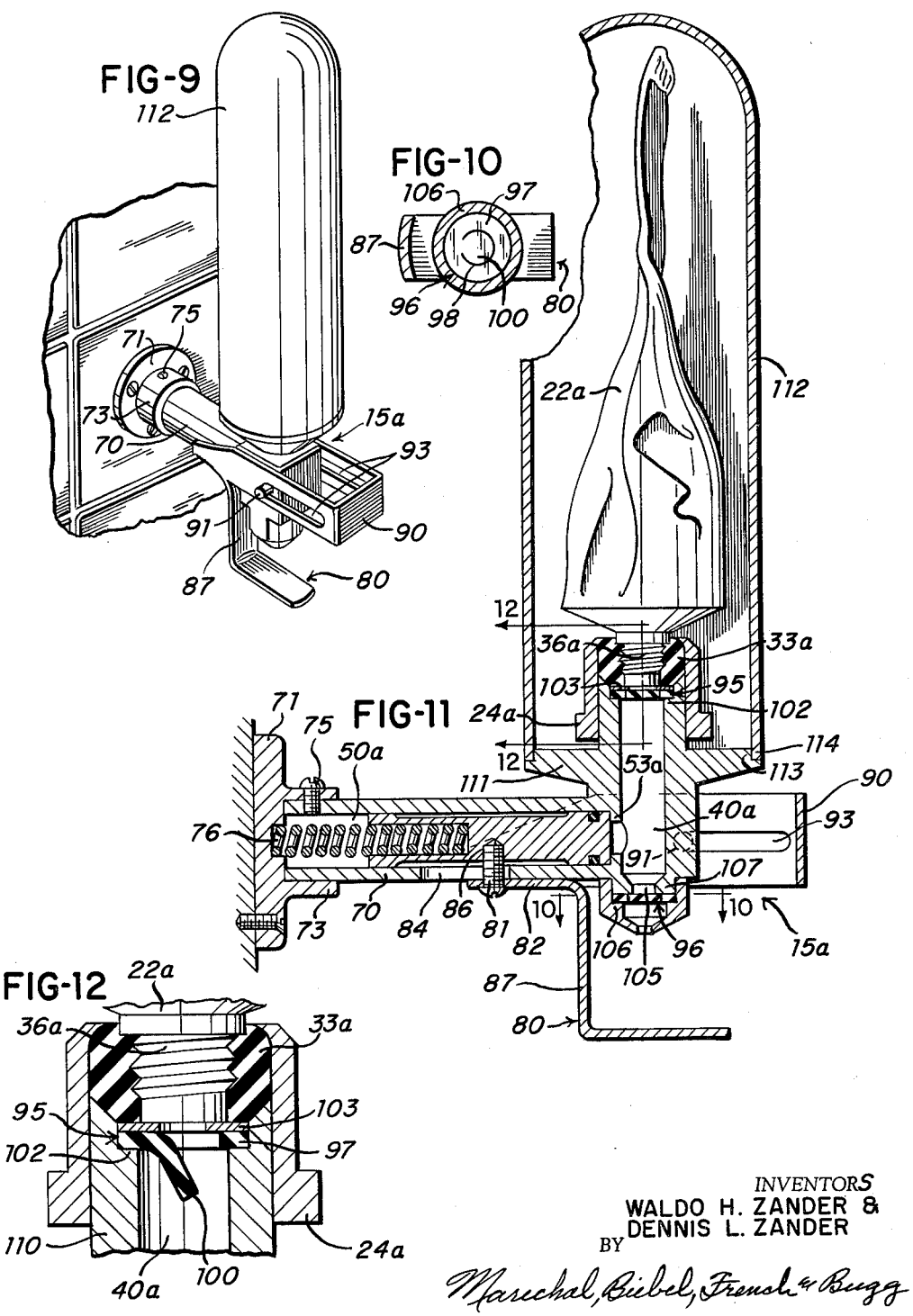

3,211,340
DISPENSING DEVICE
Waldo H. Zander, 4456 Lotz Road, and Dennis L. Zander, 4594 Druid Lane, both of Dayton, Ohio
Filed Apr. 23, 1963, Ser. No. 275,076
5 Claims. (Cl. 222—95)

This invention relates to apparatus for dispersing semi-fluid materials, and particularly to a manually operated device for dispensing cream or paste material from a tube.

The present practice in automatic toothpaste and shaving cream dispensers is to pressurize the exterior of the flexible tube in order to force the contents therefrom into a valve which controls the volume of the material that is dispensed in response to each actuation thereof. These dispensers are either quite complex and expensive, or the expedient utilized to pressurize the tube is incapable of forcing substantially all of the material from the tube thus causing some of the material to be wasted. Also, many of these devices are adapted to receive a neck or outlet of tube of only one size so that the device cannot be used with tubes of different sizes and consequently the application thereof is severely restricted. Furthermore, a serious objection to these devices lies in their inability to be easily cleaned for insuring proper operation and cleanliness, as well as for providing the capability of easily changing from one type of cream or paste material to another.

Accordingly, an important object of this invention is to provide a dispensing device for toothpaste, shaving creams, and the like which does not require external pressure on the tube in order to remove the contents thereof, and further to provide a dispensing device which will remove substantially all of the paste or cream material from the tube.

Another object of the invention is to provide a dispenser of the aforesaid type wherein any size conventional tube regardless of the shape or dimensions can be easily and quickly secured to and removed from the dispenser by an unskilled person and without disassembling the dispenser, and particularly to provide such a device with the capability of being easily cleaned so that the operational efficiency can be maintained and change over to different materials can be accomplished with minimum time and trouble.

A further object of this invention is to provide a dispensing device for paste materials which automatically supplies a predetermined amount of paste material each time it is actuated, and further to provide a dispensing device which is simple in design for maximum reliability and dependability, while being inexpensive to manufacture thereby decreasing the ultimate purchase cost.

Additional objects and advantages of the invention will be apparent from the following description, the accompanying drawings and the appended claims.

In the drawings—

FIG. 1 is a perspective view of the dispensing apparatus in accordance with the invention;

FIG. 2 is an elevation view, partially in section, illustrating the device for securing the tube on the dispensing device;

FIG. 3 is a sectional view taken essentially along the line 3—3 of FIG. 2;

FIG. 4 is a vertical sectional view through the dispensing apparatus shown in FIG. 1;

FIG. 5 is another sectional view taken essentially along the line 5—5 of FIG. 4;

FIG. 6 is a fragmentary sectional view of the dispensing apparatus showing the actuator depressed;

FIG. 7 is a sectional view similar to FIG. 6 showing the actuator in its rest position;

FIG. 8 is a bottom view of the outlet valve taken essentially along the line 8—8 of FIG. 4;

FIG. 9 is a perspective view of another embodiment of the invention;

FIG. 10 is a sectional view taken along the line 10—10 of FIG. 11;

FIG. 11 is a sectional view taken vertically through the embodiment shown in FIG. 9; and FIG. 12 is a sectional view taken along the line 12—12 of FIG. 11.

Referring to the drawings wherein preferred embodiments of the invention are illustrated, FIG. 1 shows a dispenser 10 secured to the vertical wall 11 by the screws 12 which project through the annular mounting flange 14 of the housing or body member 15 and into the wall 11. The housing 15 is generally L-shaped and includes a horizontal lower section 16 and an upper vertical section 17, which house the operative components of the dispenser, as will be described.

The annular mounting flange 14 has an integral cylindrical boss 18 (FIG. 4) which projects horizontally therefrom and is pressfitted into the open end 21 of the lower section 16 of the housing 15. By exerting sufficient force, the housing 15 can be manually removed from and replaced on the boss 18 as required for cleaning the dispenser 10. It is however within the scope of the invention to use other expedients for connecting the housing 15 to the mounting flange 14 so long as they normally position the housing in an upright manner and provide the capability of removing the housing from the wall 11.

The apparatus for securing the flexible tube 22 of toothpaste, shaving or hair cream, or the like to the upper section 17 of the housing 15 includes an annular collar 24 having the oppositely disposed cam slots 25 therein for receiving pins 26 which extend radially from rigid connections with the upper housing section 17 (FIGS. 2 and 3). The cam slots 25 are tapered with respect to the axis of the vertical housing section 17 so that rotation of the collar 24 effects the vertical movement of the collar on the housing section 17. As shown in FIG. 3, the vertical grooves 27 are provided in the internal surface of the collar 24 at the lowermost end of each cam slot 25 so that, when the pins 26 are aligned therewith, the collar 24 can be removed upwardly from the housing 15 for cleaning and the like.

The upper internal periphery of the collar 24 has an inwardly extending shoulder 30 which has a tapered surface 31 on the lower side thereof for confining the complementary upper edge 32 of the resilient bushing 33. Similarly, the upper edge 34 of the vertical housing section 17 is outwardly and upwardly tapered for confining the tapered lower edge of the bushing 33 so that downward movement of the collar 24 on the vertical section 17 causes the bushing 33 to be compressed, thus forcing it radially inwardly to engage the threaded neck 36 of the tube 22 to lock the tube on the dispenser 10. When the collar is rotated in the opposite direction, the axial pressure on the bushing 33 is relieved so that it resumes its unstressed configuration (FIG. 2) wherein the neck 36 of the tube 22 is easily removed therefrom.

An elongated shield 38 is secured to the upper housing section 17 just below the collar 24 by the resilient U-shaped clamp 39 (FIG. 5) formed integrally on the lower end thereof. The shield 38 can be made of transparent material so that the tube 22 can be viewed therethrough or it can be opaque so that the tube is hidden and the overall esthetic characteristics of the unit improve. It is, however, within the scope of this invention to completely eliminate the shield, or to construct the shield so that it entirely encloses the tube 22.

The vertical section 17 of the housing 15 has a passage 40 extending completely therethrough with the uppermost end thereof being counterbored at 42 to receive the one way valve 44. The tubular boss 45 is formed on the housing 15 in alignment with the opposite end of the passage 40 and the one way valve 46 is stretched therearound for controlling the discharge from the passage 40. The valve 44 allows flow of paste material from the tube 22 into the passage 40 while blocking flow thereof in a reverse direction, and is removable to facilitate cleaning.

The valves 44 and 46 are substantially identical and are preferably constructed of a resilient and substantially inert material, such as rubber. Each has a tubular section 47 with three integral downwardly extending triangular flaps 48 which in their unstressed position engage one another and define a substantially air tight cone, as shown in FIG. 8. Fluid pressure in tubular section 47 causes the resilient flaps 48 to pivot downwardly and away from one another to allow flow therebetween, whereas when fluid attempts to flow in the opposite direction, the flaps 48 are urged to a closed position wherein flow through the valve is blocked. When the flaps 48 are not subjected to fluid pressure, they return to their unstressed position (FIG. 8) wherein they seal the passage 40 so that the paste therein does not dry out.

The lower section 16 of the housing 15 defines a horizontal cylinder 50 which has a piston 52 reciprocally mounted therein. Movement of the piston to the right, as viewed in the drawings, is limited by a shoulder 53 which defines the opening 54 between the cylinder 50 and the passage 40, whereas movement to the left is limited by the spring 55 which is interposed between the boss 18 and the piston 52. The piston 52 is moved between these alternate positions by the actuator rod 57 which is suitably connected thereto and extends through the opening 54, the passage 40 and the aperture 58 in the housing 15, and has the actuator knob 60 provided on the outermost end thereof. The O-ring seals 61 and 62 are provided in the aperture 58 between the rod 57 and the housing, and between the piston 52 and side walls of the cylinder 50, respectively, to block the flow of fluid between these components thus creating an air tight passage 40 except for flow through the valves 44 and 46.

In operation, a tube 22 of toothpaste, shaving cream, hair cream, or the like is secured to the vertical section 17 of the housing 15 be removing the shield 38 from the dispenser 10 and the usual cap from the tube 22. The neck 36 of the tube 22 is then inserted vertically into the collar 24 and held in this position while the collar is rotated causing the resilient bushing 33 to be axially compressed and therefore radially expanded into engagement with the threaded portion of the neck 36. The material of the bushing 33 is sufficiently resilient so that it will surround the threads on the neck 36 and securely hold the entire tube 22 in the upright position. The shield 38 is then replaced on the dispenser 10.

To initiate operation of the dispenser 10, the actuator rod 57 is pushed into the housing 15 causing the piston 52 to move to the left, as shown in FIG. 6, against the bias of the spring 55. This action causes a reduction in pressure in the passage 40 which causes air from the tubular section 47 of the valve 44 and paste or cream material from the tube 22 to be drawn into the passage 40 through the upper valve 44. The lower valve 46 blocks flow of air into the passage 40 since the atmospheric pressure acting on the flaps 48 forces them tightly together. When the actuator rod 57 is released, the spring 55 returns the piston 42 to the right causing the additional air in the passage 40 to be pressurized so that a portion thereof flows outwardly through the lower valve 46. By again pushing the actuator rod 57 into the housing 15, an additional amount of paste material is drawn into the passage 40, and the spring 55 again returns the piston 42 thus expelling any additional remaining air from the passage 40. This procedure is continued until all of the air is expelled from the passage 40 and the paste material begins to flow from the valve 46.

Thereafter, each time the actuator rod 57 is depressed into the housing 15, the suction created in the passage 40 by movement of the piston 52 to the left (see FIG. 6) draws the paste or cream material from the flexible tube 22 into the passage 40 and the cylinder 50, and the spring 55 subsequently returns the piston 52 (see FIG. 7) thus forcing a predetermined amount of the material outwardly of the housing 15 through the lower valve 46 and onto a brush B or the like. As indicated hereinbefore, flaps 48 of the valves 44 and 46 preferably return to their relaxed position when the paste or cream material is not flowing therethrough, thus sealing the interior of the valve housing 15 and preventing the paste from drying out.

The amount of paste which is expelled for each actuation of the dispenser is determined by the stroke of the piston 52 and the diameter of the cylinder 50. As the piston 52 moves to the left a certain quantity of paste material is drawn into the cylinder 50, and it is this amount that is forced outwardly through the valve 46 as the spring 55 returns the piston 52 to the idle position against the shoulder 53. Thus by pushing the actuator 57 only a portion of the full stroke into the housing 15, a proportionally lower volume of paste is dispensed when it is released. It is therefore within the scope of this invention to provide indicia or calibrations on the actuator rod 57 so that the extent to which this rod is forced into the housing, and consequently the amount of paste or cream furnished, can be preselected by the operator. Furthermore, it is contemplated that adjustable mechanical stops will be provided for limiting the stroke of the piston 52 or the rod 57 to preselect the amount of paste or cream that will be furnished for each actuation of the dispenser.

An important feature of the invention lies in the fact that suction created in the passage 40 alone draws the paste or cream material from the tube 22. This suction causes the evacuation of the tube 22 to commence at the uppermost end thereof since the entire mass of paste material has a tendency to cling and slide together with respect to the side walls of the tube 22. By sucking it through the tube neck 36, the tube 22 is thus evacuated from the upper end downwardly and from the sides inwardly so that substantially the entire amount of paste material is withdrawn from the tube. Except for atmospheric pressure, no external pressure whatsoever is applied to the tube 22 in order to achieve complete evacuation thereof.

The entire dispenser 10 can be easily disassembled for routine cleaning or for cleaning when it is desirable to utilize the device with another type of paste or cream material. Thus by removing the shield 38, the tube 22 can be easily separated from the housing 15 by rotating the collar 24 as described above. The housing 15 can be removed from the mounting flange 14 by imparting a force to disconnect the horizontal section 16 of the housing 15 from the cylinder boss 18. Once this is accomplished the spring 55 can be easily removed from the open end of the cylinder 50, and by removing the knob 60 from the actuator rod 57 the piston 52 and the rod 57 can be removed through the cylinder 50.

The collar 24 and bushing 33 are removed by rotating the collar 24 so that the grooves 27 at one end of the slots 25 are aligned with the pins 26 thus permitting the collar to be removed vertically from the upper housing section 17. The upper valve 44 which snugly rests in the counterbore 42 can be removed by forcing an elongated object upward through the passage 40 to remove the valve upwardly from the housing 15. The lower valve 46 can easily be removed since it is stretched onto the tubular boss 45. By merely reversing this procedure the entire dispenser can be easily reassembled. It should be quite apparent that the entire dispenser 10 can be disassembled and completely cleaned without special tools by a person of average skill.

Another embodiment of the invention is illustrated in FIGS. 9–12 wherein components which are essentially identical to those of the FIGS. 1–8 embodiment are indicated with the same reference characters, with a lower case *a* suffixed thereto. As shown in FIG. 11, the lower horizontal section 70 of the housing 15a is secured to the mounting flange 71 by inserting the horizontal section into a hollow boss 73 formed on the flange 71, and locking these members together by a set screw 75. The return spring 76 is interposed between the mounting flange 71 and the elongated piston 77 for urging the piston to its inactive position against the shoulder 53a.

The piston 77 is moved to the left (FIG. 11) by the L-shaped actuator 80 which depends below the passage 40a so that it can be easily actuated by a toothbrush or the like. The actuator 80 is connected to the elongated piston 77 in the cylinder 50a by a screw 81 which extends through the horizontal flange 82 on the actuator 80, a slot 84 in the lower side of the housing section 70 and into the tapped hole 86 in the piston 77. Since horizontal pressure on the vertical surface 87 of the actuator 80 would tend to impart an undesirable angular motion to the piston 77, a U-shaped guide 90 is secured to the actuator 80 for transferring these forces of rotation to the housing 15a. Thus the guide 90 is secured to the actuator 77 on either side of the flange 82 and extends horizontally on either side of the housing section 70 (FIG. 9). The housing has the guide pins 91 extending therefrom into the elongated slots 93 in the guide 90 so that the forces of rotation of the actuator 80 are transferred to the housing 15 through the guide 90 and the pins 91.

This embodiment also includes a modification of the upper and lower valves 95 and 96 which operate essentially identical to the valves 44 and 46 discussed above. Each of the valves 95 and 96 comprises a thin disk 97 of resilient material having a circular cut 98 (FIG. 10) through the center portion thereof to define a flap 100 which can be moved from the plane of the disk 97. The upper valve 95 is held in position against a shoulder 102 in the passage 40a by a retaining washer 103 which is held in position by the resilient bushing 33a. The diameter of the opening in the retaining washer 103 is less than the outer diameter of the flap 100 so that the flap will not move in an upward direction from the plane of the disk 97 thus limiting flow through the valve 95 to a downward direction.

The lower valve 96 is held in position adjacent the outlet orifice 105 by the retainer 106 which is suitably secured to the boss 10 on the housing at the lower end of the passage 40a so that the valve 96 is clamped firmly in place. The inner diameter of the orifice 105 is less than the diameter of the flap 100 so that the flap 100 cannot move in an upward direction thus limiting flow therethrough to a downward direction. The valves 95 and 96 operate in substantially the same manner as the valves 44 and 46, respectively, to control the flow of paste material from the tube 22 through the passage 40a. Once the dispenser is in operation, each time the actuator 80 moves the piston 77 to the left, as viewed in FIG. 11, and the spring 76 returns the piston 77 to the right, a predetermined volume of paste material is withdrawn from the tube 22a and forced outwardly through the lower valve 96.

The neck 36a of the tube 22a is secured in position by the bushing 33a and collar 24a in a manner substantially identical to that described above in connection with the embodiment shown in FIGS. 1–8. However, the upper housing section 110 has an annular flange 111 which extends radially outwardly therefrom below the collar 24a for releasably supporting the shield 112 which completely encloses the tube 22a. The shoulder 113 around the outermost edge of the flange 111 snugly engages the lower periphery 114 of the shield to hold the shield 112 in an upright position on the housing 15a.

This embodiment can also be disassembled with relative ease for cleaning by removing the shield 112 and the collar 24a which permits removal of the bushing 33a, the retainer washer 103, and the upper valve 95. The lower valve 96 is removed by disengaging the retainer 106 from the boss 107, and the piston 77 and actuator 80 are removed by removing the screws 75 and 81 which also release the housing 15a from the mounting flange 71. Consequently, it is a simple matter to remove and clean the embodiment in order that it may be utilized to dispense another paste or cream.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A dispensing device for a tube of paste or the like comprising, a mounting plate adapted to be mounted on a vertical wall or the like, a housing including a horizontal tubular section, means for securing said tubular section of said housing on said mounting plate, an elongated vertical passage in said housing having upper and lower openings, fastening means for releasably securing the tube to said housing in an inverted vertical position with the outlet of the tube in communication with the said upper opening, a first one-way valve in said passage near said upper opening for flow of paste into said passage while blocking flow in a reverse direction, a normally closed second one-way valve in said passage near said lower opening for flow of paste from said passage through said lower opening while blocking flow in a reverse direction, said horizontal tubular section defining a cylinder having one end in communication with said passage between said upper and lower openings, a piston mounted for reciprocation in said cylinder, a slot in said tubular section below said piston, a downwardly extending L-shaped actuator connected to said piston and extending forwardly from below said tubular section to a position beneath said second one-way valve for easy engagement by a brush or the like to move said piston to the other end of said cylinder for drawing paste into said cylinder, and biasing means interposed between said mounting plate and said piston for urging said piston toward said one end of said cylinder to force the paste from said cylinder into said passage and outwardly through said second valve after said actuator means is actuated and released, said paste adapted to flow from said second one-way valve onto the brush as said biasing means returns said piston to said one end of said cylinder and be deposited on the brush as it moves on said L-shaped actuator immediately below said second one-way valve.

2. A dispensing device for a tube of paste or the like comprising, a mounting plate adapted to be mounted on a vertical wall or the like, a housing including a horizontal tubular section, means for securing said tubular section of said housing on said mounting plate, said housing having a vertical section at one end of said tubular section, said vertical section having an upper portion which extends above said horizontal section, a vertical passage through said vertical section having upper and lower openings thereto, means for releasably securing the tube to said housing in an inverted vertical position with the outlet of the tube in communication with the said upper opening, an upper one-way valve in said upper opening for controlling the flow of paste into said passage while blocking flow in a reverse direction, a normally closed one-way valve in said lower opening for flow of paste from said passage through said lower opening while blocking flow in a reverse direction, said horizontal tubular section defining a cylinder having one end in communication with said passage between said upper and lower openings, a piston mounted for reciprocation in said cylinder, an elongated actuator rod extending horizontally through said vertical section and axially into said one end of said cylinder to a connection with said piston for moving said piston to the other end of said cylinder to draw paste into said cylinder, and spring means interposed between said mounting plate and said piston for urging said piston toward said one end of said cylinder to force the paste from said cylinder into said passage and outwardly through said second valve after said actuator means is actuated and released.

3. A dispensing device as defined in claim 2 wherein a shield is releasably connected to said upper portion of said vertical section below said upper opening, said shield extending vertically upward to hide a tube of paste or the like secured to the vertical section from view.

4. A dispensing device for a tube of paste or cream material comprising, a housing adapted to be mounted on a wall or the like, an elongated passage in said housing having openings at each end thereof, means for releasably securing the tube to said housing in an inverted vertical position with the outlet of the tube in communication with a first of said openings, a first valve in said passage near said first opening having a first tubular portion secured to said housing adjacent the side walls of said passage, said first tubular portion having at least three downwardly extending resilient sections which mate together in their relaxed position to define a cone for closing said passage, said resilient sections on said first tubular portion being deformed by pressure in said tubular portion to open for flow of material from the tube into said passage through said first opening and not in a reverse direction, a normally closed second valve in said passage near the other of said openings having a second tubular portion secured to said housing adjacent the side walls of said passage, said second tubular portion having at least three downwardly extending resilient sections which mate together in their relaxed position to define a cone for closing said passage, said resilient sections on said second tubular section being deformed by pressure in said tubular portion to open for flow of the material from said passage through said other opening and not in a reverse direction, and suction means in communication with said passage intermediate said valves for drawing the material from said tube into said passage through said first valve and for forcing it outwardly of said passage through said second valve to withdraw a predetermined volume of the paste from the tube.

5. A dispensing device for a tube of paste or cream material comprising, a housing adapted to be mounted on a wall or the like, an elongated passage in said housing having openings at each end thereof, means for releasably securing the tube to said housing in an inverted vertical position with the outlet of the tube in communication with a first of said openings, a first valve in said passage near said first opening including a first disk of resilient material which blocks the associated end of said passage, a first circular flap cut in said first disk for movement from the plane of said disk in response to pressure to provide an opening through which the material will flow from the tube into said passage through said first opening, a normally closed second one-way valve in said passage near the other of said openings including a second disk of resilient material which blocks the associated end of said passage, a second circular flap cut in said second disk for movement from the plane of said second disk in response to pressure to provide an opening through which the material will flow from said passage outwardly of said housing, retainer means adjacent one side of each of said disks for prohibiting movement of said flaps in one direction so that the material flows only from the tube into said passage through said first opening and outwardly of said passage through said other opening, and suction means in communication with said passage intermediate said valves for effecting material flow into said passage through said first valve and for forcing it outwardly of said passage through said second valve to withdraw a predetermined volume of the paste from the tube.

References Cited by the Examiner

UNITED STATES PATENTS

| | | | |
|---|---|---|---|
| 1,700,364 | 1/29 | Bishop et al. | 222—490 X |
| 1,801,066 | 4/31 | Bastian | 222—340 |
| 2,096,397 | 10/37 | Harris | 222—95 |
| 2,216,890 | 10/40 | Phillips | 222—490 X |
| 2,620,943 | 12/52 | Critelli et al. | 222—95 |
| 2,709,025 | 5/55 | Scott | 222—95 X |

OTHER REFERENCES

German application, 1,017,080, printed October 3, 1957.

RAPHAEL M. LUPO, *Primary Examiner.*